US008307636B2

(12) United States Patent
Matsunaga (10) Patent No.: US 8,307,636 B2
(45) Date of Patent: Nov. 13, 2012

(54) ADDITION VALVE CONTROL METHOD AND ADDITION VALVE CONTROLLER (75) Inventor: Yasuhiro Matsunaga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 431 days.

(21) Appl. No.: 12/738,230

(22) PCT Filed: Oct. 20, 2008

(86) PCT No.: PCT/IB2008/002787
§ 371 (c)(1),
(2), (4) Date: Apr. 15, 2010

(87) PCT Pub. No.: WO2009/053806
PCT Pub. Date: Apr. 30, 2009

(65) Prior Publication Data
US 2010/0229534 A1 Sep. 16, 2010

(30) Foreign Application Priority Data
Oct. 24, 2007 (JP) ................. 2007-276511

(51) Int. Cl.
F01N 3/00 (2006.01)

(52) U.S. Cl. ............... 60/286; 60/274; 60/295; 60/297; 60/277; 239/5; 239/533.2; 73/114.69

(58) Field of Classification Search ............... 60/274, 60/285–287, 295–301; 239/5, 533.1–533.15, 239/584; 73/114.01–114.81
See application file for complete search history.

(56) References Cited

U.S. PATENT DOCUMENTS

| 2002/0029564 A1* | 3/2002 | Roth et al. ................. 60/286 |
| 2007/0277509 A1* | 12/2007 | Tahara et al. ............... 60/286 |
| 2011/0041815 A1* | 2/2011 | Henriksson et al. ......... 123/564 |
| 2012/0085841 A1* | 4/2012 | Lee et al. ................. 239/533.2 |

FOREIGN PATENT DOCUMENTS

| EP | 1 331 373 A2 | 7/2003 |
| EP | 1 512 847 A2 | 3/2005 |
| EP | 1 672 191 A1 | 6/2006 |
| JP | A-2003-201836 | 7/2003 |
| JP | A-2003-222019 | 8/2003 |
| JP | A-2005-344682 | 12/2005 |
| JP | A-2007-64183 | 3/2007 |
| JP | A-2007-71175 | 3/2007 |
| JP | A-2007-321575 | 12/2007 |

OTHER PUBLICATIONS

Sep. 30, 2009 Office Action issued in Japanese Patent Application No. 2007-276511 (with translation).
May 12, 2009 Search Report issued in International Patent Application No. PCT/IB2008/002787.
May 12, 2009 Written Opinion issued in International Patent Application No. PCT/IB2008/002787.

* cited by examiner

Primary Examiner — Thomas Denion
Assistant Examiner — Jesse Bogue
(74) Attorney, Agent, or Firm — Oliff & Berridge, PLC (57) ABSTRACT To suppress clogging of an injection nozzle that supplies fuel to an exhaust passage of an engine, a controller executes intermittent addition of fuel from the injection nozzle. In executing the intermittent addition, the controller calculates a particulate discharge amount within the exhaust passage based on the engine operation state, and multiplies the exhaust gas temperature by the intake air rate to calculate the exhaust energy. Then, based on the particulate discharge amount and the exhaust energy, the controller calculates the amount of fuel to be added.

16 Claims, 6 Drawing Sheets

ADDITION VALVE CONTROL METHOD AND ADDITION VALVE CONTROLLER

BACKGROUND OF THE INVENTION

1. Field of the Invention

The present invention relates to a control method and a controller that control an addition valve that supplies an additive to the exhaust passage of an internal combustion engine. The control method and the controller intermittently add an additive that suppresses clogging of the addition valve.

2. Description of the Related Art

The exhaust system of some internal combustion engines is provided with an exhaust purifying member such as a carrier that carries a NOx purifying catalyst that purifies NOx (nitrogen oxide), a PM filter for collecting particulate matter in exhaust gas, or a DPNR catalyst having a NOx purifying catalyst carried on a PM filter.

An additive is often supplied to such an exhaust purifying member for the purpose of recovering its purifying function. For example, by supplying fuel as such an additive to a PM filter on which a NOx purifying catalyst is carried, NOx absorbed by the catalyst is reduced/released to recover the NOx purifying function of the NOx purifying catalyst. Also, particulate matter collected by the PM filter is burnt.

When the additive is supplied from an addition valve provided in the exhaust passage of an internal combustion engine, the distal end portion of the addition valve is exposed to high-temperature exhaust gas. Thus, additive remaining in the inner portion of the distal end of the addition valve often solidifies, thereby clogging of the addition valve. Also, clogging may also occur when particulates such as soot enter and adhere to the inner portion of the distal end of the addition valve.

Accordingly, in the technique described in Japanese Patent Application Publication No. 2003-222019 (JP-A-2003-222019), for example, in addition to adding additive to recover the function of an exhaust purifying member, the additive is added intermittently to suppress clogging of the addition valve described above.

In the device described in JP-A-2003-222019, the additive is added before the additive remaining at the distal end portion of the addition valve solidifies, thus optimizing the interval of addition when executing intermittent addition. On the other hand, the amount of additive added when executing intermittent addition is set to an amount that is neither too large nor too small in suppressing occurrence of clogging. However, there are cases where the addition amount is too much or too small in suppressing occurrence of clogging despite of the above addition control.

SUMMARY OF THE INVENTION

The present invention provides an addition valve control method and an addition valve controller that set an addition amount of additive in a suitable manner when performing intermittent addition to suppress clogging of an addition valve.

A first aspect of the present invention relates to an addition valve control method for intermittently adding an additive to suppress clogging of an addition valve that supplies the additive to an exhaust passage of an internal combustion engine. The addition valve control method calculates a particulate discharge amount within the exhaust passage based on an engine operation state. The addition valve control method calculates exhaust energy from an exhaust gas temperature and an exhaust gas flow rate. The addition valve control method calculates an amount of the additive to be added when intermittently adding the additive, based on the particulate discharge amount and the exhaust energy.

By adding additive from the addition valve, particulates present at the distal end portion of the addition valve and deposited inside the distal end portion, or additive that has not solidified yet can be blown away. Also, the distal end portion can be cooled.

The amount of particulates that accumulate at the distal end portion of the addition valve decreases as the particulate discharge amount within the exhaust passage decreases. Thus, the smaller the particulate discharge amount, the smaller the required addition amount that can blow away particulates that have been deposited at the distal end portion of the addition valve or fuel that has not solidified yet. Also, solidification of fuel proceeds less rapidly as the amount of heat transferred from exhaust gas to the distal end portion of the addition valve decreases. Thus, the smaller the amount of heat that is transferred, the smaller the required addition amount that can sufficiently cool the distal end portion. Accordingly, in the above-mentioned aspect, the particulate discharge amount within the exhaust passage is calculated based on the engine operation state, and the amount of heat that moves from exhaust gas to the distal end portion of the addition valve is calculated based on exhaust energy obtained from the exhaust gas temperature and the exhaust gas flow rate, thereby accurately calculating the amount of heat moved. Then, by calculating the addition amount of additive to be added at the time of executing intermittent addition based on the particulate discharge amount and the exhaust energy, an addition amount according to the deposition amount of particulates can be calculated, and also an addition amount required for lowering the distal end temperature of the addition valve can be calculated. Therefore, it is possible to set an optimum, neither too large nor too small, addition amount for suppressing the occurrence of clogging of the addition valve.

In the above-mentioned aspect, the addition amount may be calculated based on a corrected particulate discharge amount, which is obtained by correcting the particulate discharge amount in accordance with a degree of change in the intake air amount that is a value equivalent to the exhaust gas flow rate, and the exhaust energy.

An intake air rate can be used as a value that substitutes for the above-mentioned exhaust gas flow rate. Incidentally, when calculating the particulate discharge amount based on the engine operation state, as the exhaust gas flow rate increases, the amount of particulates passing through the vicinity of the distal end of the addition valve also increases, which increases the likelihood of clogging of the addition valve. In this regard, during a transient period in which the intake air rate changes, the change of the exhaust gas flow rate is delayed relative to the change of the intake air rate. Accordingly, in the above-mentioned aspect, the particulate discharge amount calculated based on the engine operation state is corrected in accordance with the degree of change in the intake air rate, thereby making it possible to calculate the amount of particulates passing through the vicinity of the distal end of the addition valve with greater accuracy. Then, an addition amount is calculated based on the corrected discharge amount and the above-mentioned exhaust energy. Thus, even during a transient period in which the exhaust gas flow rate changes, an appropriate addition amount is set in accordance with the particulate discharge amount.

In the above-mentioned aspect, a sack portion in which the additive remains is provided at the distal end portion of the addition valve. The addition valve control method further comprises calculating a residual amount of the additive in the sack portion when addition of the additive is suspended during the intermittent addition, and adding the additive when the residual amount is equal to or below a threshold amount.

When the above-mentioned sack portion is filled with additive, particulate matter does not readily enter the sack portion, so the additive value is less likely to clog. At the time of intermittent addition, additive that has remained in the sack portion gradually evaporates from the sack, portion during a period in which addition of additive is suspended, so the clogging suppression effect gradually decreases. Accordingly, in the above-mentioned aspect, while addition is suspended during intermittent addition, the residual amount of additive in the sack portion is calculated, and the additive is added when the calculated residual amount is equal to or less than a preset threshold. Thus, when the residual amount of additive in the sack portion becomes small, and there is a possibility of the addition valve becoming clogged, additive is added from the addition valve before such clogging actually occurs. Thus, according to the above-mentioned aspect, the additive addition timing can be set appropriately, and clogging of the addition valve can be suppressed appropriately. In the above-mentioned aspect, other than the residual amount itself, a residual rate, an evaporation amount, or an evaporation rate may be obtained as a value indicating the residual amount of additive in the sack portion.

In the above-mentioned aspect, the addition amount calculated based on the particulate discharge amount and the exhaust energy is an aggregate addition amount of the additive that is supplied from the addition valve over a preset period. The addition valve control method may set, an actual time taken until the residual amount is equal to or below the threshold amount, after addition of the additive is started, as an addition interval time, and calculating an addition amount per individual addition of the intermittent addition based on the set addition interval time and the aggregate addition amount.

According to the above-mentioned aspect, the addition interval, which represents a period of time after an addition is started until the next addition is performed during intermittent addition of additive, is set appropriately in accordance with a decrease in the residual amount of additive in the sack portion. Also, based on the aggregate addition amount of additive to be supplied from the addition valve over a preset period, and the above-mentioned addition interval time, the number of additions executed over the preset period is obtained, and an addition amount per one addition is calculated from the number of additions executed and the above-mentioned aggregate addition amount. Therefore, according to the above-mentioned aspect, the addition amount to be added at the time of executing addition after the residual amount becomes equal to or less than the threshold can be appropriately calculated.

Further, the actual time taken until the above-mentioned residual amount becomes equal to or below the threshold amount is set as an addition interval time, and an addition amount per individual addition is calculated based on the thus set addition interval time and the aggregate addition amount. Thus, there is no need to individually adapt the addition interval time and the addition amount per one addition to an engine operation state, and the number of steps required for the adaptation can be reduced as well.

In the above-mentioned aspect, if the residual amount is below the threshold amount, an immediately previous value of the addition interval time and an immediately previous value of the addition amount per individual addition may be used.

In the above-mentioned aspect, the addition valve control method may detect a temperature of a distal end of the addition valve when addition of the additive is suspended during the intermittent addition, and adding the additive when the distal end temperature is equal to or above a threshold temperature.

As additive is added from the addition valve, the distal end temperature of the addition valve decreases. However, during a period when addition of the additive is suspended during the intermittent addition, the distal end temperature gradually increases, so additive that has remained inside the distal end of the addition valve becomes more likely to solidify. Accordingly, in the above-mentioned aspect, while addition is suspended during intermittent addition, the distal end temperature of the addition valve is calculated, and the additive is added when the calculated distal end temperature becomes equal to or higher than a threshold distal end temperature. Thus, when the distal end temperature of the addition valve becomes high, and the addition valve may become clogged, the additive is injected from the addition valve before such clogging actually occurs. In this way, according to the above-mentioned aspect, the additive addition timing may be set appropriately, thus making it possible to appropriately suppress clogging of the addition valve.

In the above-mentioned aspect, the addition amount calculated based on the particulate discharge amount and the exhaust energy is an aggregate addition amount of the additive that is supplied from the addition valve over a preset period. The addition valve control method may set, an actual time taken until the distal end temperature is equal to or above the threshold temperature, after addition of the additive is started, as an addition interval time, and calculating an addition amount per individual addition in the intermittent addition based on the set addition interval time and the aggregate addition amount.

According to the above-mentioned aspect, the addition interval, which represents a time between the end of an addition and the next beginning of, an addition, is set appropriately in accordance with an increase in the distal end temperature of the addition valve. Also, based on the aggregate addition amount of additive to be supplied from the addition valve over a preset period, and the addition interval time, the number of additions executed over the preset period is obtained, and an addition amount per individual addition is obtained from the number of additions executed and the aggregate addition amount. Therefore, according to the above-mentioned aspect, the addition amount to be added, when executing addition after the distal end temperature of the addition valve is equal to or above the threshold, may be appropriately calculated.

Further, the actual time taken until the above-mentioned distal end temperature is equal to or exceeds the threshold temperature is set as an addition interval time, and an addition amount per individual addition is calculated based on the thus set addition interval time and the aggregate addition amount. Thus, there is no need to individually adapt the addition interval time and the addition amount per individual addition to the engine operation state, and the number of steps required for adaptation of these values can be reduced as well.

In the above-mentioned aspect, if the distal end temperature is below the threshold temperature, an immediately previous value of the addition interval time and an immediately previous value of the addition amount per individual addition may be used.

In the above-mentioned aspect, a sack portion, in which the additive remains, is provided at the distal end portion of the addition valve. The addition valve control method may calculate, a residual amount of the additive in the sack portion and a distal end temperature of the addition valve when addition of the additive is suspended during the intermittent addition, and adding the additive when one of a first condition and a second condition is satisfied. The first condition is satisfied when the residual amount is equal to or below a threshold amount, and the second condition is satisfied when the distal end temperature is equal to or above a threshold temperature.

As described above, factors causing clogging of the addition valve include intrusion of particulate matter following a decrease in the residual amount of additive in the sack portion, and solidification of additive inside the distal end of the addition valve following a rise in the distal end temperature of the addition valve. Thus, in the above-mentioned aspect, when there is a possibility of the addition valve becoming clogged due to one of the above-mentioned factors, additive is added from the addition valve before such clogging actually occurs. Therefore, the additive addition timing can be set appropriately, and clogging of the addition valve can be also suppressed appropriately.

In the above-mentioned aspect, the addition amount calculated based on the particulate discharge amount and the exhaust energy is an aggregate addition amount of the additive that is supplied from the addition valve over a preset period. The addition valve control method may set, an actual time taken until one of the first condition and the second condition is satisfied, after addition of the additive is started, as an addition interval time, and calculating an addition amount per individual addition in the intermittent addition based on the set addition interval time and the aggregate addition amount.

According to the above-mentioned aspect, the addition interval, which represents a period of time after an addition is started until the next addition is performed during intermittent addition of additive, is set appropriately in accordance with a decrease in the residual amount of additive in the sack portion, or in accordance with the increase in the distal end temperature of the addition valve. Also, based on the aggregate addition amount of additive to be supplied from the addition valve over a preset period, and the above-mentioned addition interval time, the number of additions executed over the preset period is obtained, and an addition amount per individual addition is calculated from the number of additions executed and the aggregate addition amount. Therefore, according to the above-mentioned aspect, the addition amount to be added at the time of executing addition after the above-mentioned first aspect or the above-mentioned second aspect is met can be appropriately calculated.

Further, the actual time taken until the above-mentioned residual amount becomes equal to or below the threshold, or the actual time taken until the above-mentioned distal end temperature becomes equal to or above the threshold is set as an addition interval time, and an addition amount per individual addition is calculated based on the addition interval time thus set and the aggregate addition amount. Thus, there is no need to individually adapt the addition interval time and the addition amount per individual addition to the engine operation state, and the number of steps required for adaptation of these values can be reduced as well.

In the above-mentioned aspect, if neither the first condition nor the second condition is satisfied, an immediately previous value of the addition interval time and an immediately previous value of the addition amount per individual addition may be used. In the above-mentioned aspect, the residual amount, when addition of the additive is suspended during the intermittent addition, may be calculated based on the exhaust gas temperature and the duration of the suspension of addition during the intermittent addition.

The residual amount of additive in the sack portion decreases as the exhaust gas temperature increases, or as the duration of addition suspension increases. According to the above-mentioned aspect in which the residual amount is calculated based on the exhaust gas temperature and the duration of addition suspension, the residual amount can be calculated appropriately.

In the above-mentioned aspect, the distal end temperature, when addition of the additive is suspended during the intermittent addition, may be calculated based on the exhaust energy and the duration of the suspension of addition during the intermittent addition.

The distal end temperature of the addition valve increases as the exhaust energy increases, or as the duration of addition suspension increases. According to the above-mentioned aspect in which the distal end temperature is calculated based on the exhaust energy and the duration of addition suspension, the above-mentioned distal end temperature may be calculated appropriately.

Other than being directly detected by a sensor or the like, the above-described exhaust gas temperature can be also estimated based on the engine speed, the engine load, and the like. Also, when calculating the particulate discharge amount based on the engine operation state, the particulate discharge amount may be estimated based on the engine speed, the engine load, and the like. Also, examples of the above-mentioned additive include engine fuel.

A second aspect of the present invention relates to an addition valve controller that intermittently adds an additive to suppress clogging of an addition valve that supplies the additive to an exhaust passage of an internal combustion engine. The addition valve controller includes a calculating unit. The calculating unit calculates a particulate discharge amount within the exhaust passage 8 based on the engine operation state. The calculating unit calculates exhaust energy from an exhaust gas temperature and an exhaust gas flow rate. The calculating unit 25 calculates an amount of the additive to be added when intermittently adding the additive, based on the particulate discharge amount and the exhaust energy.

In the above-mentioned aspect, the addition amount is calculated based on a corrected particulate discharge amount and the exhaust energy, wherein the corrected particulate discharge amount being obtained by using an intake air rate as a value equivalent to the exhaust gas flow rate and correcting the particulate discharge amount in accordance with a degree of change in the intake air rate, and the addition determining unit adds the additive from the addition valve when the internal combustion engine satisfies a predetermined condition.

BRIEF DESCRIPTION OF THE DRAWING

The foregoing and further features and advantages of the invention will become apparent from the following description of example embodiments with reference to the accompanying drawings, wherein like numerals are used to represent like elements and wherein.

DETAILED DESCRIPTION OF AN EMBODIMENT

Figure 1:
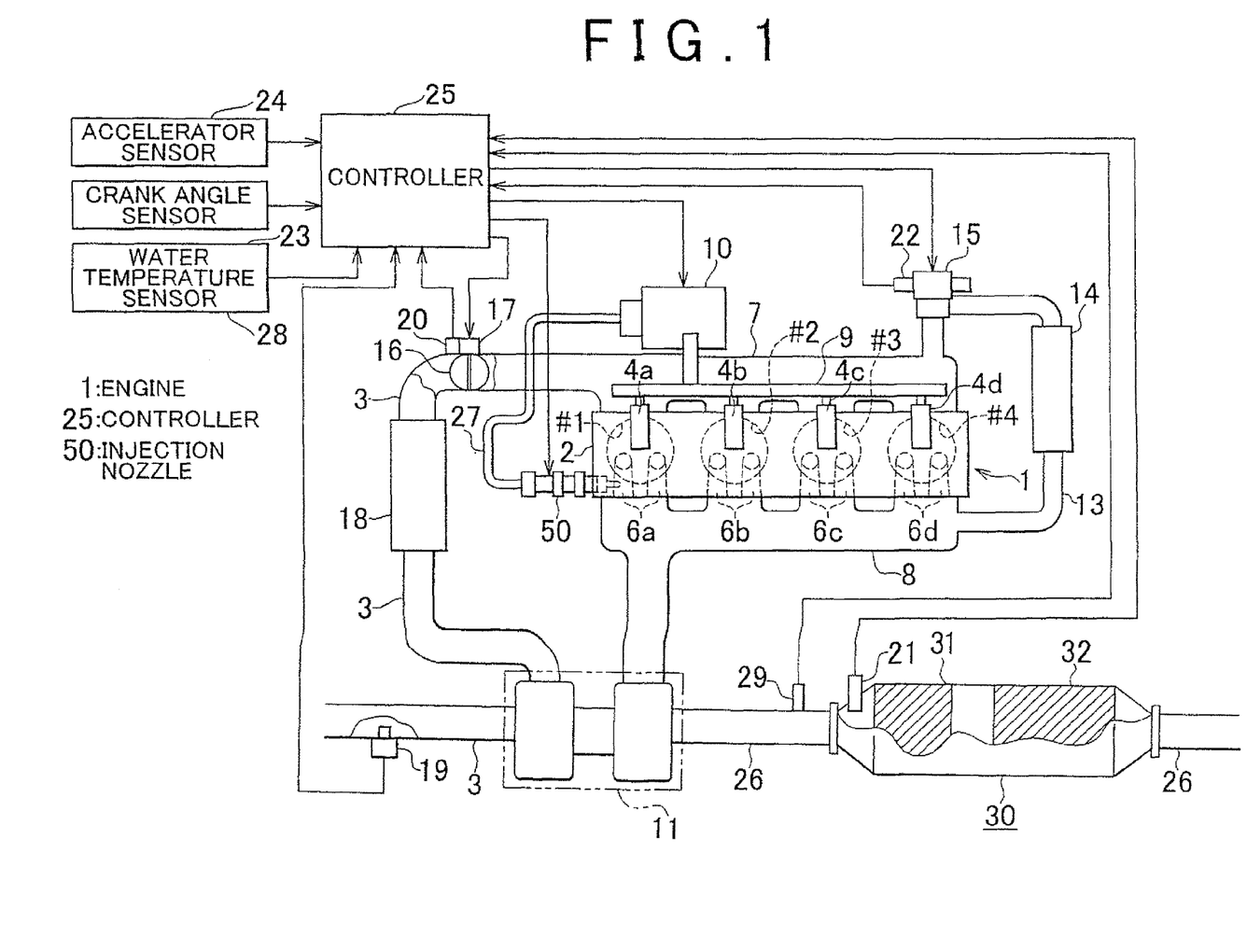
FIG. 1 is a diagram showing an internal combustion engine and configuration in the vicinity thereof to which an addition valve control method according to an embodiment of the present invention is applied.

FIG. 1 is schematic diagram showing a diesel engine controller to which an addition valve control method according to this embodiment is applied and an engine 1 and the configuration in the vicinity thereof to which this controller is applied. While the engine 1 shown in FIG. 1 is a straight 4-cylinder engine, other types of engine may be used.

A plurality of cylinders #1 to #4 are provided in the engine 1. A plurality of fuel injection valves 4a to 4d are attached to each cylinder head 2. The fuel injection valves 4a to 4d inject fuel to combustion chambers of the respective cylinders #1 to #4. Also, in the cylinder head 2, intake ports for introducing outside air into the cylinders, and exhaust ports 6a to 6b for discharging combustion gas to the outside of the cylinders are provided in association with each cylinder #1 to #4.

The fuel injection valves 4a to 4d are connected to a common rail 9 that accumulates high-pressure fuel. The common rail 9 is connected to a supply pump 10. The supply pump 10 draws fuel from a fuel tank and supplies high-pressure fuel to the common rail 9. The high-pressure fuel supplied to the common rail 9 is injected into the cylinders from the respective fuel injection valves 4a to 4d when the fuel injections valves 4a to 4d are opened.

An intake manifold 7 is connected to the intake ports. The intake manifold 7 is connected to an intake passage 3. A throttle valve 16 for regulating the intake air rate is provided within the intake passage 3.

An exhaust manifold 8 is connected to the exhaust ports 6a to 6d. The exhaust manifold 8 is connected to an exhaust passage 26. A catalyst device 30 that purifies exhaust components is interposed in the exhaust passage 26. Two exhaust purifying members are disposed in series inside the catalyst device 30.

Of the two exhaust purifying members, the exhaust purifying member provided on the exhaust upstream side is a NOx occlusion-reduction catalyst 31 that purifies NOx in exhaust gas. The exhaust purifying member provided on the exhaust downstream side of the NOx occlusion-reduction catalyst 31 is a DPNR (Diesel Particulate-NOx Reduction system) catalyst 32 that reduces the amount of particulate matter, such as soot in exhaust gas, that is released to the atmosphere, that is, the amount of PM and NOx. The DPNR catalyst 32 is a NOx occlusion-reduction catalyst carried on a porous ceramic structure, and PM in exhaust gas is collected when passing through a porous wall. If the air/fuel ratio of exhaust gas is lean, NOx in exhaust gas is occluded by the NOx occlusion-reduction catalyst, and when the air/fuel ratio is rich, the occluded NOx is reduced by HC, CO, or the like.

In addition to these components, the engine 1 also includes an EGR device. The EGR device introduces a portion of exhaust gas into intake air to reduce the combustion temperature in the cylinders, thereby reducing the amount of NOx generated. The EGR device includes an EGR passage 13 that connects the intake passage 3 and the exhaust passage 26, an EGR valve 15 provided in the EGR passage 13, an EGR cooler 14, and the like. As its opening is regulated, the EGR valve 15 regulates the amount of exhaust gas re-circulated from the exhaust passage 26 to the intake passage 3, that is, the EGR amount. The EGR cooler 14 reduces the temperature of exhaust gas flowing in the EGR passage 13. The EGR valve 15 is provided with an EGR valve opening sensor 22, which detects the opening of the EGR valve 15, that is, an FOR valve opening EA.

The engine 1 also includes a turbocharger 11 for supercharging intake air introduced into the cylinders, by using exhaust pressure. An intercooler 18 is provided in the intake passage 3 between the intake-side compressor of the turbocharger 11 and the throttle valve 16 to lower the temperature of intake air, which has been heated through the supercharging by the turbocharger 11.

Various sensors are attached to the engine 1 to detect the engine operation state. For example, an airflow meter 19 detects an intake air rate GA in the intake passage 3. A throttle opening sensor 20 detects the opening of the throttle valve 16. An air/fuel ratio sensor 21 detects the air/fuel ratio of exhaust gas. An exhaust gas temperature sensor 29 detects the exhaust gas temperature upstream of the catalyst device 30. A crank angle sensor 23 detects the rotational speed of a crankshaft, that is, the engine speed NE. An accelerator sensor 24 detects the depression amount of an accelerator pedal, that is, a pedal operation amount ACCP. A water temperature sensor 28 detects the coolant temperature of the engine 1.

The outputs of these various sensors are input to the controller 25. The controller 25 is configured mainly by a microcomputer including a central processing unit (CPU), a read-only memory (ROM) that pre-stores various programs, maps, and the like, a random access memory (RAM) that temporarily stores the results of computation by the CPU or the like, a timer counter, an input interface, an output interface, and the like. The controller 25 executes various controls for the engine 1, such as control of the fuel injection amount and fuel injection timing of the fuel injection valves 4a to 4d, the discharge pressure of the supply pump 10, the driving amount of an actuator 17 that opens and closes the throttle valve 16, and the opening of the EGR valve 15.

On the other hand, an injection nozzle 50 is attached to the cylinder head 2. The injection nozzle 50 is an addition valve for supplying fuel to the NOx occlusion-reduction catalyst 31 and the DPNR catalyst 32. As the additive, fuel is injected from the injection nozzle 50 into the exhaust port 6a of the first cylinder #1. The fuel injected at this time reaches the NOx occlusion-reduction catalyst 31 and the DPNR catalyst 32, together with exhaust gas. The injection nozzle 50 and the supply pump 10 are connected to each other by a fuel supply pipe 27 so fuel, such as light oil, is supplied. The injection nozzle 50 is of the same structure as the fuel injection valves 4a to 4d, and the injection amount and injection timing of the injection nozzle 50 are controlled by the controller 25.

Figure 2:
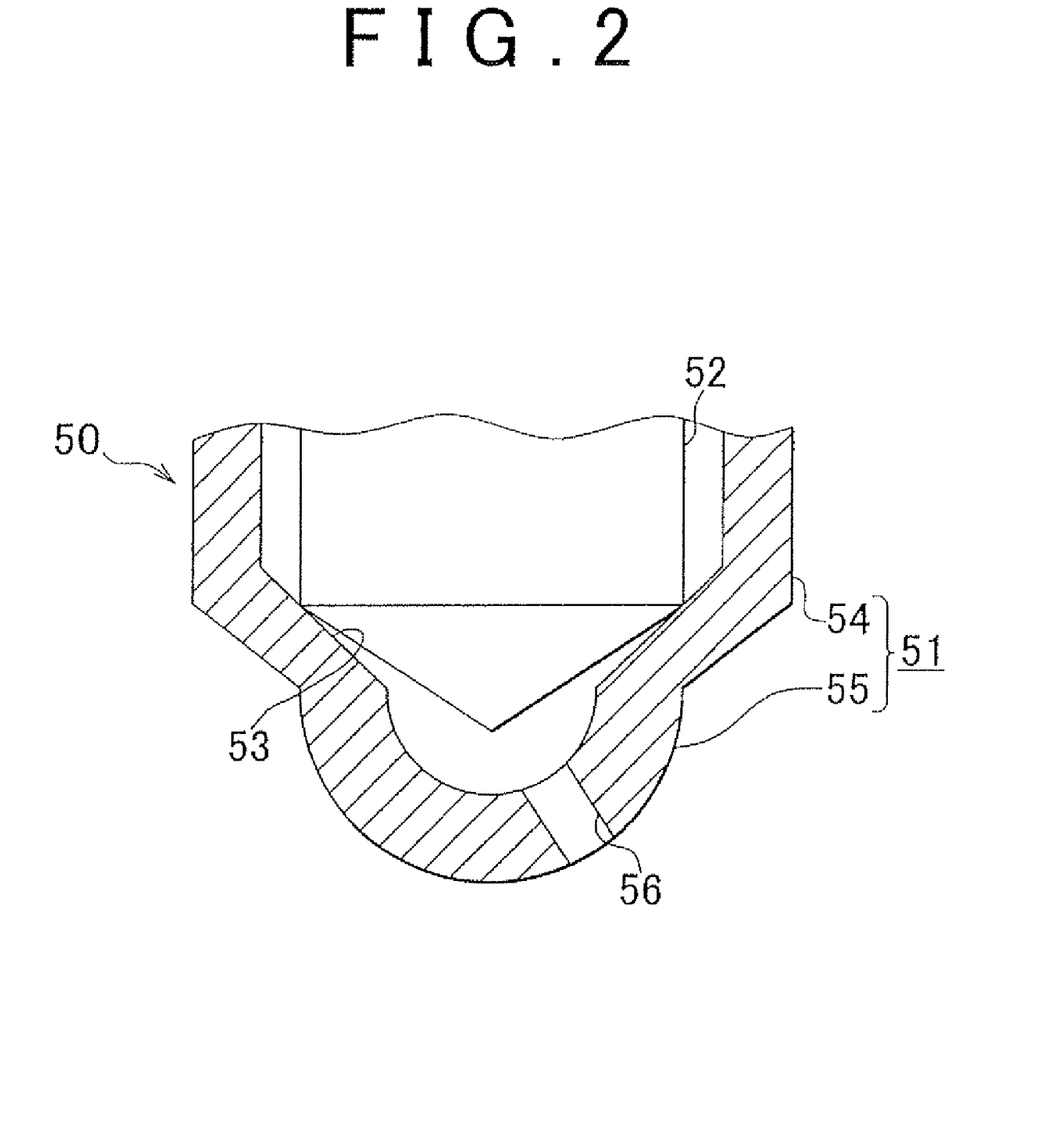
FIG. 2 is a schematic illustration of the cross-sectional structure of an injection nozzle according to the embodiment, at its distal end portion.

FIG. 2 schematically shows the cross-sectional structure of the distal end portion of injection nozzle 50. As shown in FIG. 2, the injection nozzle 50 is attached to the cylinder head 2 in such a way that its distal end portion projects toward the exhaust port 6a. The injection nozzle 50 includes a substantially cylindrical housing 51 made of metal, and a needle valve 52 that reciprocates within the housing 51. A valve seat 53, on and from which the distal end portion of the needle valve 52 sits and moves away, is formed in the inner peripheral portion on the distal end side of the housing 51. The housing 51 includes a substantially cylindrical sleeve 54 that accommodates the needle valve 52, and a hollow, semi-spherical sack portion 55 formed on the distal end side with respect to the valve seat 53. Fuel in the common rail 9 is introduced into the internal space of the sack portion 55. An injection hole 56, which serves as a passage communicating with the internal space of the sack portion 55, is formed at the distal end portion of the sack portion 55.

Then, addition of fuel from the injection nozzle 50 is carried out when the NOx occlusion-reduction catalyst 31 and the DRNR catalyst 32 are in a predetermined temperature region, and NOx occluded in the NOx occlusion-reduction catalyst 31 and the DRNR catalyst 32 is thus reduced. Addition of fuel from the injection nozzle 50 is also carried out when the amount of PM collected by the DPNR catalyst 32 becomes equal to or more than a predetermined amount, and thus the collected PM is burnt. As the addition of fuel from the injection nozzle 50 is carried out in this way, the function of the catalyst device 30 is recovered.

The distal end portion of the injection nozzle 50 is exposed to high-temperature exhaust gas. Thus, clogging often occurs in the injection nozzle 50 as fuel remaining inside the sack portion 55 solidifies or as particulates such as soot enter and adhere to the sack portion 55.

Accordingly, in this embodiment, in addition to performing addition of fuel aimed at recovering the function of the catalyst device 30, intermittent addition of fuel is performed in order to suppress clogging of the injection nozzle 50. By performing such intermittent addition, particulate matter that deposited on inside the sack portion 55 and fuel that has not solidified yet are blown away. Also, by performing such intermittent addition, the distal end portion of the injection nozzle 50 is cooled to suppress solidification of fuel within the sack portion 55.

A description will be given of how control is affected at the time of executing the intermittent addition mentioned above. The amount of particulates that is deposited in the sack portion 55 decreases as the amount of particulates discharged from the engine 1 decreases. Thus, the smaller the particulate discharge amount, the smaller the addition amount required to remove particulates that have been deposited in the sack portion 55 or fuel that has not solidified yet. Also, solidification of fuel within the sack portion 55 proceeds slower as the amount of heat that moves from exhaust gas to the distal end portion of the injection nozzle 50 decreases. Thus, the smaller the amount of heat has moved, the smaller the amount of additive needed to cool the distal end portion of the fuel injection nozzle 50.

Accordingly, in this embodiment, the particulate discharge amount is calculated based on the engine operation state, and the amount of heat that is transferred from exhaust gas to the distal end portion of the injection nozzle 50 is calculated based on the exhaust energy obtained from the exhaust gas temperature and the exhaust gas flow rate, thereby accurately calculating the amount of heat transferred. Then, by calculating the amount of fuel to be added at the time of executing intermittent addition based on the particulate discharge amount and the exhaust energy, an addition amount according to the deposition amount of particulates is calculated, and also an addition amount required for reducing the distal end temperature of the injection nozzle 50 is calculated, thereby setting an appropriate addition amount to suppress clogging of the injection nozzle 50.

In contrast, if the sack portion 55 is filled with fuel, particulate matter does not readily enter the sack portion 55, so the injection nozzle 50 is less likely to clog. During intermittent addition, fuel that remains in the sack portion 55 gradually evaporates from the sack portion 55 when addition of fuel is suspended, so the clogging suppression effect gradually decreases with the elapse of the addition suspension period. Further, although the distal end temperature of the injection nozzle 50 decreases as fuel is added from the injection nozzle 50, when the addition of fuel is suspended, the distal end temperature gradually increases due to the transfer of heat from exhaust gas. Thus, solidification of fuel that remains within the sack portion 55 proceeds with the elapse of the addition suspension period.

Factors that promote clogging of the injection nozzle 50 include intrusion of particulate matter following a decrease in the residual amount of fuel within the sack portion 55, and solidification of fuel within the sack portion 55 following an increase in the distal end temperature of the injection nozzle 50. Accordingly, in this embodiment, when the intermittent addition is suspended, the residual amount of fuel in the sack portion 55 and the distal end temperature of the injection nozzle 50 are calculated, and fuel is added when the calculated residual amount is equal to or less than a threshold residual amount, or if the calculated distal end temperature is equal to or higher than a threshold distal end temperature. By adding fuel at such timing, when there is a possibility of the injection nozzle 50 becoming clogged due to one of the above factors, fuel is added from the injection nozzle 50 before such clogging actually occurs.

Figure 3:
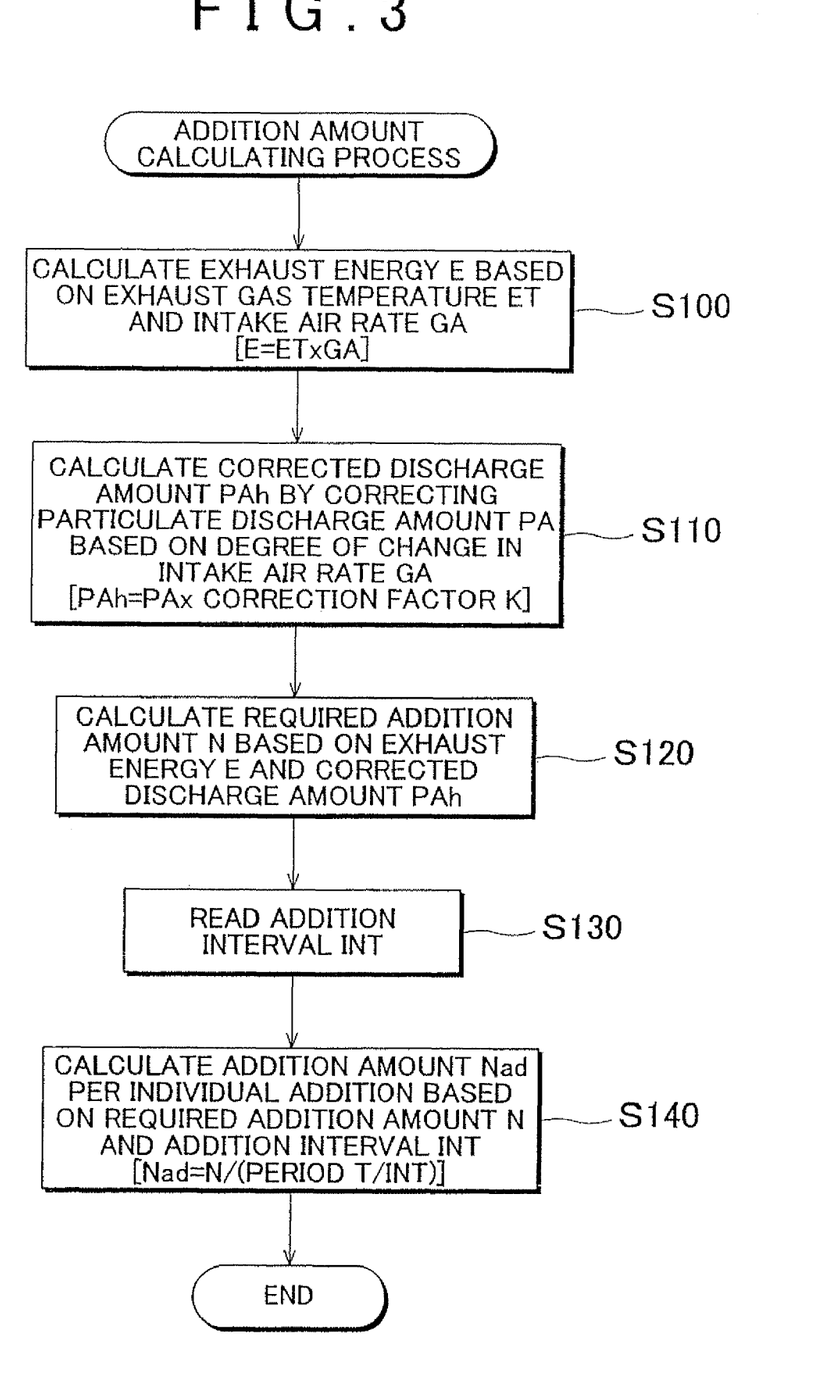
FIG. 3 is a flowchart showing the procedure of an addition amount calculating process according to the embodiment.

FIG. 3 shows the process of calculating an addition amount to be added when executing intermittent addition. The process is y executed at predetermined intervals by the controller 25. When this process starts, the controller 25 first calculates exhaust energy E from Equation (1) below, based on an exhaust gas temperature ET and an intake air rate GA (S100).

$$E = ET(K) \times GA (g/\text{sec}) \quad (1)$$

The exhaust gas temperature ET represents exhaust gas temperature near the distal end portion of the injection nozzle 50, and is calculated based on the engine speed NE and an engine load KL. In this embodiment, while the engine load KL is represented by the ratio of the current intake air rate GA to the intake air rate at WOT (at full load), and the engine load KL may be also obtained based the amount of fuel injected from the fuel injection valves 4a to 4d, or the accelerator operation amount ACCP. Also, the intake air rate GA is used as a substitution for the exhaust gas flow rate near the distal end of the injection nozzle 50.

The amount of heat that is transferred from the exhaust gas to the distal end portion of the injection nozzle 50, in other words, the amount of heat received at the distal end portion of the injection nozzle 50, increases as the exhaust gas flow rate increases, even when the exhaust gas temperature remains the same. Accordingly, in Equation (1) mentioned above, the exhaust energy E is obtained on the basis of the exhaust gas temperature ET and the intake air rate GA as a substitution value for the exhaust gas flow rate. Thus, the amount of heat per unit time that is transferred from the exhaust gas to the distal end portion of the injection nozzle 50 may be calculated with greater accuracy.

Next, the controller 25 calculates a orrected discharge amount PAh (S110) by correcting the particulate discharge amount PA, that is calculated based on the engine operation state, on the basis of a degree of change in the intake air rate GA. The corrected discharge amount PAh is calculated using Equation (2) below.

$$PAh = PA \times K \quad (2)$$

The particulate discharge amount PA is calculated based on the engine speed NE and the fuel injection amount Q of the fuel injection valves 4a to 4d as described above. Also, the correction factor K is a value set based on the degree of change in the intake air rate GA. The correction factor K increased as the amount of change in the intake air rate GA increases (for example, as the amount of change per unit time increases). The above-mentioned process of step S110 is executed for the following, reason. When calculating the particulate discharge amount PA based on the engine operation state, as the exhaust gas flow rate increases, the amount of particulates passing through the vicinity of the distal end of the injection nozzle 50 also increases, which increases the likelihood of clogging of the injection nozzle 50. In this regard, during a transient period in which the intake air rate changes, the change of the exhaust gas flow rate is delayed relative to the change of the intake air rate. Accordingly, in step S110, the calculated particulate discharge amount PA is corrected in accordance with the degree of change in the intake air rate, thereby making it possible to calculate the amount of particulates passing through the vicinity of the distal end of the injection nozzle 50 with greater accuracy.

Figure 4:
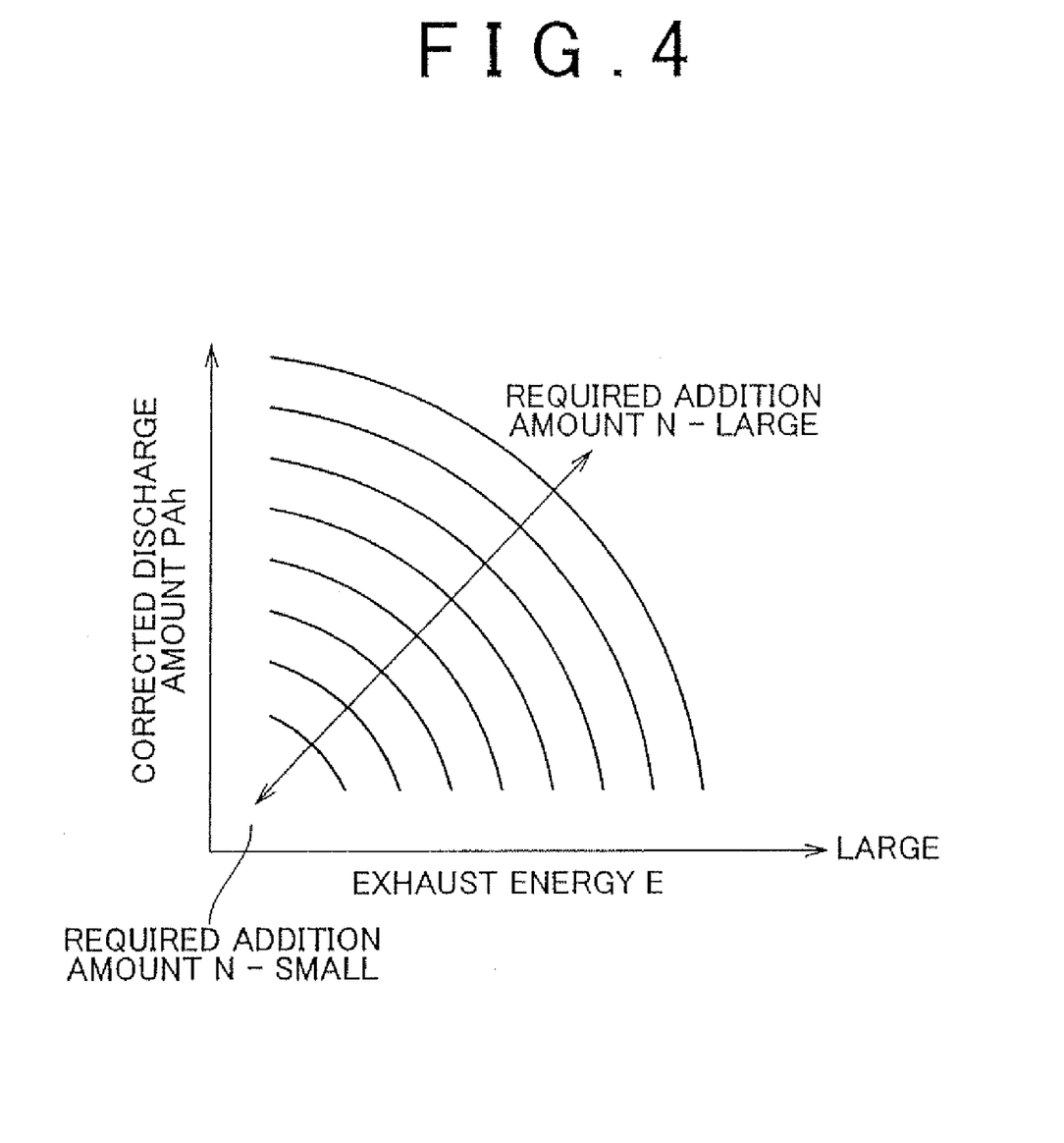
FIG. 4 is a conceptual diagram showing how a required addition amount map is set according to the embodiment.

Next, based on the exhaust energy E and the corrected discharge amount PAh, the controller 25 sets a required addition amount N by referencing a required addition amount map (S120). The required addition amount N is indicates the aggregate addition amount of fuel added from the injection nozzle 50 within a preset period T when executing intermittent addition of fuel, in other words, a value indicating the aggregate amount of fuel injected from the injection nozzle 50 when fuel is injected a plurality of times within the period T. In this embodiment, for example, the aggregate addition amount per one minute is set as the required addition amount N. The required addition amount map is pre-stored in the ROM of the controller 25. As shown in FIG. 4, the required addition amount map is set such that the greater the exhaust energy B, or the greater the corrected discharge amount PAh, the required addition amount N that is set.

Because the required addition amount N is set based on the particulate discharge amount and exhaust energy, an addition amount corresponding to the deposition amount of particulates is calculated, and an addition amount required for reducing the temperature of the sack portion 55 is calculated, thereby setting an optimum addition amount for suppressing clogging in the injection nozzle 50.

In this embodiment, in particular, a required addition amount N is calculated based on the corrected discharge amount PAIL and the exhaust energy E. Thus, even during a transient period in which the exhaust gas flow rate changes, an appropriate addition amount is set in accordance with the particulate discharge amount.

Next, the controller 25 reads an addition interval INT at which intermittent addition is executed (S130). The addition interval INT represents addition interval time at which intermittent addition is executed. The method of setting the addition interval INT will be described later. Then, based on the addition interval INT and the required addition amount N, the controller 25 calculates an addition amount Nad per individual addition from Equation (3) (S140), and terminates the process, $$Nad=N/(T/INT) \qquad (3)$$

As the period T in Equation (3) above, as described above, "one minute" is set in this embodiment. Therefore, in the term of "period T/addition interval INT", the number of additions per one minute is calculated. Then, by dividing the required addition amount N by the number of additions, the addition amount Nad per individual addition is calculated.

After the addition amount Nad is calculated, the valve opening time of the injection nozzle 50 is set so that the addition amount Nad is supplied from the injection nozzle 50, and the opening operation of the injection nozzle 50 is performed based on the valve opening time.

Figure 5:
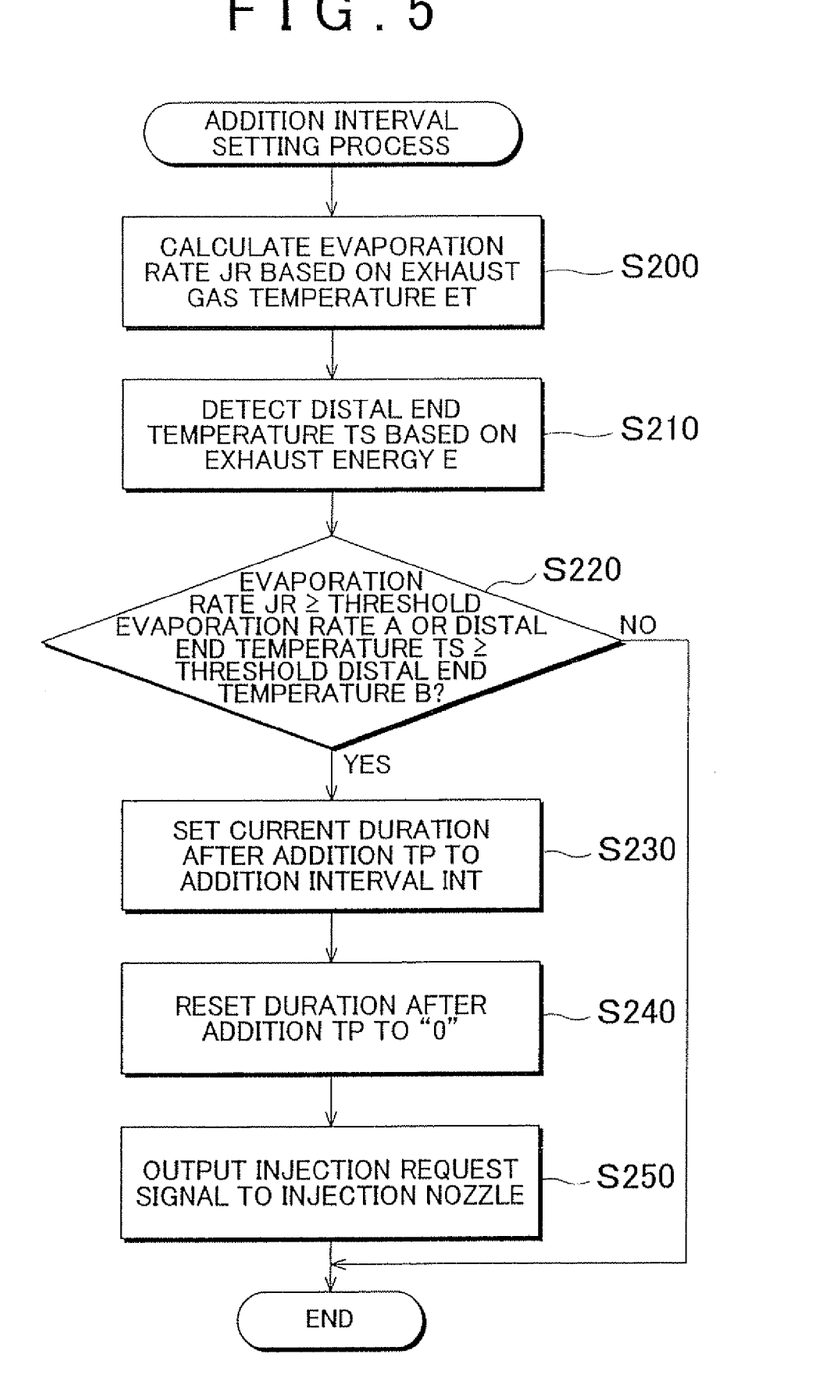
FIG. 5 is a flowchart showing the procedure of an addition interval setting process according to the embodiment.

Next, the process of setting the addition interval INT will be described. FIG. 5 shows the procedure of the addition interval INT setting process. This process is also executed at predetermined intervals by the controller 25.

When this process is started, the controller 25 first calculates a fuel evaporation rate JR within the sack portion 55 based on the exhaust gas temperature ET (S200). The fuel evaporation rate JR is a value equivalent to the above-mentioned residual amount of fuel within the sack portion 55, and is calculated as follows.

That is, while addition of fuel is performed, the sack portion 55 is filled with fuel, so the fuel evaporation rate JR is set to "0%". On the other hand, while addition of fuel is suspended, the residual amount of fuel within the sack portion 55 decreases as the exhaust gas temperature increases or as the duration of addition suspension becomes longer. Accordingly, while the addition of fuel is suspended, a value Ijr is added to the fuel evaporation rate JR each time the process is executed. The value Ijr is set based on the exhaust gas temperature ET. Because the fuel evaporation amount within the sack portion 55 increases as the exhaust gas temperature ET increases, the value Ijr is increased as the exhaust gas temperature ET increases. In this way, the fuel evaporation rate JR is calculated based on the exhaust gas temperature ET and the duration of addition suspension. Thus, the fuel evaporation rate JR is calculated appropriately.

Next, the controller 25 calculates a distal end temperature TS of the injection nozzle 50 on the basis of the exhaust energy E described above (S210). The distal end temperature TS is calculated as follows. That is, while addition of fuel is performed, the distal end temperature of the injection nozzle 50 decreases, so the distal end temperature TS is gradually reduced each time this process is executed. On the other hand, when the addition of fuel is suspended, as the exhaust energy E described above becomes larger, or as the duration of addition suspension becomes increases, the distal end temperature of the injection nozzle 50 increases. Accordingly, when the addition of fuel is suspended, a value Its is added to the value of the distal end temperature TS each time the process is executed. The value Its is set based on the exhaust energy E. Because the distal end temperature of the injection nozzle 50 increases as the exhaust energy E increases, the value Its is also increased. In this way, the distal end temperature TS is calculated based on the exhaust energy E and the duration of addition suspension. Thus, the distal end temperature TS is calculated appropriately.

It should be noted that the amount of heat that is transferred from exhaust gas to the distal end portion of the injection nozzle 50 is calculated more accurately when the exhaust energy E is used than when the exhaust gas temperature ET is used. Therefore, by setting the value Its based on the exhaust energy E as in this embodiment, the accuracy of estimation of the distal end temperature TS is improved as compared with a case where the value Its is set based on the exhaust gas temperature ET.

Next, the controller 25 determines whether at least one of the following first and second conditions is satisfied with respect to the current evaporation rate JR and the current distal end temperature. TS (S220). First condition: evaporation rate JR≧threshold evaporation rate A.

Second condition: distal end temperature TS≧ threshold distal end temperature B. As the above-mentioned threshold evaporation rate A, a value that allows for a predetermined margin with respect to an evaporation rate at which clogging occurs in the injection nozzle 50 is set. Also, as the above-mentioned threshold distal end temperature B, a value that allows for a predetermined margin with respect to a distal end temperature at which clogging occurs in the injection nozzle 50 is set.

If neither the first condition nor the second condition is satisfied (S220: NO), the controller 25 terminates the process. On the other hand, if at least one of the first condition and the second condition is satisfied (S220: YES), the controller 25 determines that there is a possibility that the injection nozzle 50 may become clogged, and then sets the current duration after addition TP to the addition interval INT (S230). The duration after addition TP is the time elapsed up to the present since the start of fuel addition. Measurement of the duration after addition TP begins as the operation of a timer provided inside the controller 25 is started at the point when a valve opening signal is output to the injection nozzle 50 from the controller 25. Then, through the process of step S230, the actual time taken until one of the first condition and the second condition is satisfied after addition of fuel is started is set as the addition interval INT. Therefore, the addition interval INT, which represents a period of time after an addition is started until the next addition is performed during intermittent addition of fuel, is set appropriately in accordance with a decrease in the residual amount of fuel within the sack portion 55, or in accordance with an increase in the distal end temperature of the injection nozzle 50.

Next, the controller 25 resets the duration after addition TP to "0" (S240), outputs an injection request signal to the injection nozzle 50 (S250), and terminates the process. When the calculation of the addition amount Nad described above is completed after the addition amount Nad has been calculated, a valve opening signal is output to the injection nozzle 50, and fuel is added from the injection nozzle 50.

Figure 6:
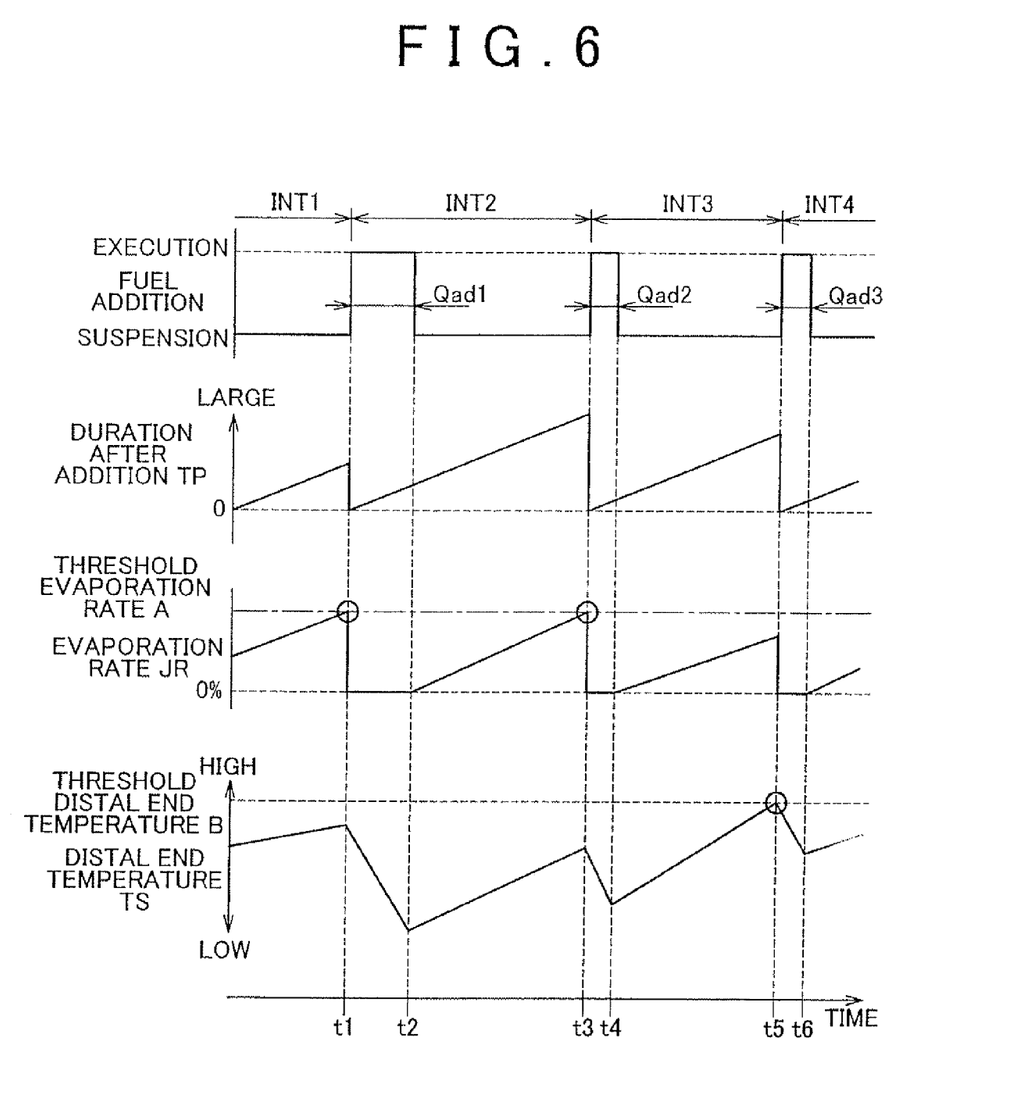
FIG. 6 is a timing chart showing how intermittent addition is executed according to the embodiment.

FIG. 6 shows how injection is affected during intermittent addition through execution of the addition amount calculating process and the addition interval setting process mentioned above. As shown in FIG. 6, when addition of fuel is started at time t1, measurement of the duration after addition TP is started, and the fuel evaporation rate JR is set to "0%". Then, while addition of fuel is performed (time t1 to time t2), the fuel evaporation rate JR is kept at "0%", and the distal end temperature TS is gradually reduced from the temperature at time t1. Then, when injection of the addition amount Nad1 is completed and addition of fuel is suspended (time t2), thereafter, the fuel evaporation rate JR and the distal temperature TS are gradually increased with the elapse of the addition suspension time. Then, if the fuel evaporation rate JR reaches the threshold evaporation rate A before the distal end temperature TS reaches the threhsold distal end temperature B (time t3), the duration after addition TP is set as an addition interval INT2. Once the addition interval INT2 is thus set, the duration after addition TP is reset, and an injection request signal is output to the injection nozzle 50. Then, using the addition interval INT2, an addition amount Nad2 for the next addition of fuel is calculated. Once the addition amount Nad2 is calculated, addition of fuel is executed again.

In this way, when the residual amount of fuel in the sack portion 55 becomes small, and there is a possibility that the injection nozzle 50 may become clogged, fuel is injected from the injection nozzle 50 before such clogging actually occurs. Thus, the fuel addition timing is set appropriately, thus appropriately suppressing clogging of the injection nozzle 50. As the fuel is added when the fuel evaporation rate JR reaches the threshold evaporation rate A, the distal end temperature of the injection nozzle 50 also decreases. Thus, it is possible to suppress not only clogging of the injection nozzle 50 due to such factors as intrusion of particulate matter following a decrease in the residual amount of fuel within the sack portion 55, but also clogging of the injection nozzle 50 due to such factors as solidification of fuel within the sack portion 55 following an increase in the distal end temperature of the injection nozzle 50.

When addition of fuel is started, by the addition amount Nad2, (time t3+α"α: processing time until a valve opening signal is output to the injection nozzle 50 after the addition interval INT2 is set"), measurement of the duration after addition TP is started again, and the fuel evaporation rate JR is set to "0%". Then, when fuel is being added (time t3 to time t4), the fuel evaporation rate JR remains at "0%", and the distal end temperature TS is gradually reduced from the temperature at time t3. Then, when the addition amount Nad2 is injected and further addition of fuel is suspended (time t4), the evaporation rate JR and the distal temperature TS gradually increase with the elapse of the addition suspension time. Then, if the evaporation rate JR reaches the threshold evaporation rate A before the distal end temperature TS reaches the threshold distal end temperature B (time t5), the duration after addition TP is set as an addition interval INT3 when the distal end temperature TS reaches the threshold distal end temperature B. Once the addition interval INT3 is set, the duration after addition TP is reset, and an injection request signal is output to the injection nozzle 50. Then, using the above-mentioned addition interval INT3, an addition amount Nad3 for the next addition of fuel is calculated through the execution of the addition amount calculating process. When the addition amount Nad3 is calculated, addition of fuel is executed again (time t5+α"α: processing time until a valve opening signal is output to the injection nozzle 50 after the addition interval INT3 is set").

In this way, when the distal end temperature of the injection nozzle 50 becomes high, and there is a possibility of the injection nozzle 50 may become clogged, fuel is injected from the injection nozzle 50 before such clogging actually occurs. Thus, the fuel addition timing is set appropriately to suppress clogging of the injection nozzle 50. As the fuel is added when the distal end temperature TS reaches the threshold distal end temperature B, the sack portion 55 becomes filled with fuel. Thus, it is possible to suppress not only clogging of the injection nozzle 50 due to such factors as solidification of fuel within the sack portion 55 following a rise in the distal end temperature of the injection nozzle 50 but also clogging of the injection nozzle 50 due to particulate matter entering the sack portion 55 due to a decrease in the residual amount of fuel within the sack portion 55.

In this embodiment, the addition interval INT is set by measuring the actual time taken until the fuel evaporation rate JR reaches the threshold evaporation rate A or the actual time taken until the distal end temperature TS reaches the threshold distal end temperature B, and the addition amount Nad per individual addition is calculated based on the addition interval INT that is set and the required addition amount N. Thus, there is no need to individually adapt the addition interval INT and the addition amount Nad per individual addition corresponding to each engine operation state, and the number of steps required to adapt these values may be reduced as well.

As described above, this embodiment provides the following effects.

(1) The particulate discharge amount in the exhaust passage is calculated based on the engine operation state, and the amount of heat that is transferred from exhaust gas to the distal end portion of the injection nozzle 50 is calculated on the basis of the exhaust energy E that is obtained from the exhaust gas temperature ET and the intake air rate GA equivalent to an exhaust gas flow rate, thereby calculating the amount of heat transferred with greater accuracy. Further, the required addition amount N of fuel when executing the intermittent addition is calculated based on the particulate discharge amount and the exhaust energy E. It is thus possible to calculate the required addition amount N according to the amount of particulates deposited within the sack portion 55, and calculate the required addition amount N required for reducing the distal end temperature of the injection nozzle 50. Therefore, it is possible to set the addition amount N for suppressing the occurrence of clogging in the injection nozzle 50 to an appropriate amount.

(2) The particulate discharge amount PA calculated on the basis of the engine operation state is corrected in accordance with a degree of change in the intake air rate GA. Thus, even during a transient period in which the intake air rate changes, in other words, even during a transient period in which the exhaust gas flow rate changes, the amount of particulates that pass through the vicinity of the distal end of the injection nozzle 50 may be calculated accurately. Then, since the above-mentioned required addition amount N is calculated based on the corrected particulate discharge amount (corrected discharge amount PAh) and the exhaust energy E, the required addition amount N according to an amount PA may be set appropriately even during a transient period in which the exhaust gas flow rate changes.

(3) As described above, factors causing clogging of the injection nozzle 50 include intrusion of particulate matter following a decrease in the residual amount of fuel within the sack portion 55, and solidification of fuel within the sack portion 55 following a rise in the distal end temperature of the injection nozzle 50. Accordingly, the fuel evaporation rate JR within the sack portion SS and the distal end temperature TS of the injection nozzle 50 are calculated during suspension of addition in intermittent addition, and fuel is added when either the first condition, requiring that the evaporation rate JR be equal to or higher than the threshold evaporation rate A, or the second condition, requiring that the distal end temperature TS be equal to or higher than the threshold distal end temperature B, is satisfied. Thus, when there is a possibility that the injection nozzle 50 may become clogged due to one of the above factors, fuel is added from the injection nozzle 50 before such clogging actually occurs. Therefore, the fuel addition timing may be set appropriately, and clogging of the injection nozzle 50 can be also suppressed appropriately.

(4) The aggregate addition amount of fuel that is supplied from the injection nozzle 50 within the preset period T is calculated as the above-mentioned required addition amount N. Then, the actual time taken until either the first condition or second condition is satisfied after addition of fuel is started is set as the addition interval INT, and the addition amount Nad per individual addition in the intermittent addition is calculated based on the thus set addition interval INT and the required addition amount N.

Therefore, the addition interval INT, which represents a period of time after an addition is started until the next addition is performed during intermittent addition of fuel, is set appropriately in accordance with a decrease in the residual amount of fuel within the sack portion 55, or in accordance with an increase in the distal end temperature of the injection nozzle 50. Also, because the addition amount Nad per individual addition is obtained based on the aggregate addition amount of fuel to be supplied from the injection nozzle 50 within the preset period T, and the addition interval INT, the addition amount Nad to be added at the time of executing addition after the above-mentioned first condition or second condition is met may be calculated appropriately.

The actual time taken until the fuel evaporation rate JR is equal to or above the threshold evaporation rate A, or the actual time taken until the distal end temperature TS is equal to or above the threshold distal end temperature B may be set as the addition interval INT, and the addition amount Nad per individual addition is calculated based on the resulting addition interval INT and the required addition amount N. Thus, there is no need to individually adapt the addition interval INT and the addition amount Nad per individual addition corresponding to each engine operation state, and the number of steps required to adjust these values may be reduced as well.

(5) The fuel evaporation rate JR is calculated based on the exhaust gas temperature ET and the addition suspension time during intermittent operation. Thus, the evaporation rate JR may be calculated appropriately.

(6) The distal end temperature TS is calculated based on the exhaust energy E and the addition suspension time during intermittent addition. Thus, the distal end temperature TS may be calculated with greater accuracy.

The above-described embodiment may be modified and implemented as follows.

(a) While the particulate discharge amount PA is calculated based on the engine speed NE and the fuel injection amount Q, the particulate discharge amount PA may be calculated based on the engine speed NE and the engine load KL.

(b) The exhaust gas temperature ET may be calculated based on the detected exhaust gas temperature by the above-mentioned exhaust gas temperature sensor 29 and the engine speed NE. In this case, the exhaust gas temperature near the distal end portion of the injection nozzle 50 may be estimated with greater accuracy. Also, the exhaust gas temperature ET may be directly detected by providing a temperature sensor near the distal end portion of the injection nozzle 50.

(c) While the fuel evaporation rate JR is indicates the residual amount of fuel in the sack portion 55, an evaporation amount may be obtained. Also, the residual amount of fuel in the sack portion 55 itself, or the proportion of the residual amout of fuel may be obtained. If the residual amount or the proportion of the residual amout of fuel is to be obtained, the processes performed when the above-mentioned fuel evaporation rate JR equals or exceeds the threshold evaporation rate A may be performed when the residual amount or residual rate is equal to or below a predetermined threshold.

(d) While in the above-described embodiment the fuel evaporation rate JR and the distal end temperature TS are calculated, calculation of one of these values may be omitted. In this case as well, by calculating the fuel evaporation value JR, for example, if the residual amount of fuel in the sack portion 55 becomes small, and there is a possibility that the injection nozzle 50 may become clogged, fuel is added from the injection nozzle 50 before such dogging actually occurs. Thus, the fuel addition timing may be set appropriately, and clogging of the injection nozzle 50 may be also suppressed appropriately. Further, the addition amount Nad to be added after the fuel evaporation rate JR is equal to or above the threshold evaporation rate A may be also appropriately calculated. Also, there is no need to individually adapt the addition interval INT and the addition amount Nad per individual addition corresponding to each engine operation state, and the number of steps required to adjust these values may be reduced as well.

Further, by calculating the distal end temperature TS, for example, when the distal end temperature of the injection nozzle 50 is high, and there is a possibility of the injection nozzle 50 will become clogged, fuel is injected from the injection nozzle 50 before such clogging actually occurs. Thus, the fuel addition timing may be set appropriately, and clogging of the injection nozzle 50 may be minimized appropriately. Further, the addition amount Nad to be added after the distal end temperature TS is equal to or above the determination value B may be also appropriately calculated. Also, there is no need to individually adapt the addition interval INT and the addition amount Nad per individual addition corresponding to each engine operation state, and the number of steps required to adjust these values may be reduced as well.

(e) The number of exhaust purifying members provided inside the catalyst device 30 according to the above-described embodiment and its modifications may be changed as appropriate.

(f) The exhaust purifying members provided inside the catalyst device 30, according to the above-described embodiment and its modifications, may be changed as appropriate. For example, the DPNR catalyst 32 may be substituted with a DPF (Diesel Particulate Filter), that is, to an exhaust purifying member that functions only as a PM filter that collects PM and the like in exhaust gas. Also, when catalyst purifying members of different kinds are provided inside the catalyst device 30, the positional relationship with respect to the flow direction of exhaust gas may be set as appropriate. For example, the exhaust purifying members inside the catalyst device 30 may be positioned such that the DPNR catalyst 32 is upstream of the NOx occlusion-reduction catalyst 31.

(g) While the additive according to the above-described embodiment and its modifications is fuel for an internal combustion engine, any other kind of additive that yields similar results may be used.

(h) According to the above-described embodiment and its modifications, the injection nozzle 50 may be attached at any position on the exhaust passage, upstream side of the catalyst device 30. Also, the injection nozzle 50 is not restricted to one having a structure similar to that of the fuel injection valves 4a to 4d. The present invention can be similarly applied to any addition valve that supplies an additive to an exhaust purifying member.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An addition valve control method for intermittently adding an additive to suppress clogging of an addition valve that supplies the additive to an exhaust passage of an internal combustion engine, the addition valve control method characterised by comprising:
    calculating a particulate discharge amount within the exhaust passage based on an engine operation state;
    calculating exhaust energy from an exhaust gas temperature and an exhaust gas flow rate; and
    calculating an amount of the additive to be added when intermittently adding the additive, based on the particulate discharge amount and the exhaust energy, wherein the addition amount is calculated based on a corrected particulate discharge amount, which is obtained by correcting the particulate discharge amount in accordance with a degree of change in, the intake air amount that is a value equivalent to the exhaust gas flow rate, and the exhaust energy.

2. An addition valve control method for intermittently adding an additive to suppress clogging of an addition valve that supplies the additive to an exhaust passage of an internal combustion engine, the addition valve control method comprising:
    calculating a particulate discharge amount within the exhaust passage based on an engine operation state;
    calculating exhaust energy from an exhaust gas temperature and an exhaust as flow rate and
    calculating an amount of the additive to be added when intermittently adding the additive based on the particulate discharge amount and the exhaust energy,
    wherein a sack portion in which the additive remains is provided at the distal end portion of the addition valve; and
    wherein the addition valve control method further comprises calculating a residual amount of the additive in the sack portion when addition of the additive is suspended during the intermittent addition, and adding the additive when the residual amount is equal to or below a threshold amount, wherein:
    the addition amount calculated based on the particulate discharge amount and the exhaust energy is an aggregate addition amount of the additive that is supplied from the addition valve over a preset period; and
    the addition valve control method further comprises setting an actual time taken until the residual amount is equal to or below the threshold amount, after addition of the additive is started, as an addition interval time, and calculating an addition amount per individual addition of the intermittent addition based on the set addition interval time and the aggregate addition amount.

3. The addition valve control method according to claim 2, wherein if the residual amount is below the threshold amount, an immediately previous value of the addition interval time and an immediately previous value of the addition amount per individual addition are used.

4. An addition valve control method for intermittently adding an additive to suppress clogging of an addition valve that su es the additive to an exhaust passage of an internal combustion engine, the addition valve control method comprising:
    calculating a particulate discharge amount within the exhaust passage based on an engine operation state;
    calculating exhaust energy from an exhaust gas temperature and an exhaust gas flow rate;
    calculating an amount of the additive to be added when intermittently adding the additive, based on the particulate discharge amount and the exhaust energy; and
    detecting a temperature of a distal end of the addition valve when addition of the additive is suspended during the intermittent addition, and adding the additive when the distal end temperature is equal to or above a threshold temperature.

5. The addition valve control method according to claim 4, wherein:
    the addition amount calculated based on the particulate discharge amount and the exhaust energy is an aggregate addition amount of the additive that is supplied from the addition valve over a preset period; and
    the addition valve control method further comprises setting an actual time taken until the distal end temperature is equal to or above the threshold temperature, after addition of the additive is started, as an addition interval time, and calculating an addition amount per individual addition in the intermittent addition based on the set addition interval time and the aggregate addition amount.

6. The addition valve control method according to claim 5, wherein if the distal end temperature is below the threshold temperature, an immediately previous value of the addition interval time and an immediately previous value of the addition amount per individual addition are used.

7. An addition valve control method according to for intermittently adding an additive to suppress clogging of an addition valve that supplies the additive to an exhaust passage of an internal combustion engine, the addition valve control method comprising:

calculating a particulate discharge amount within the exhaust passage based on an engine operation state;

calculating exhaust energy from an exhaust gas temperature and an exhaust gas flow rate; and calculating an amount of the additive to be added when intermittently adding the additive, based on the particulate discharge amount and the exhaust energy, wherein a sack portion, in which the additive remains, is provided at the distal end portion of the addition valve, and wherein the addition valve control method further comprises calculating a residual amount of the additive in the sack portion and a distal end temperature of the addition valve when addition of the additive is suspended during the intermittent addition, and adding the additive when one of a first condition and a second condition is satisfied, wherein the first condition is satisfied when the residual amount is equal to or below a threshold amount, and the second condition is satisfied when the distal end temperature is equal to or above a threshold temperature.

8. The addition valve control method according to claim 7, wherein:

the addition amount calculated based on the particulate discharge amount and the exhaust energy is an aggregate addition amount of the additive that is supplied from the addition valve over a preset period; and the addition valve control method further comprises setting, an actual time taken until one of the first condition and the second condition is satisfied, after addition of the additive is started, as an addition interval time, and calculating an addition amount per individual addition in the intermittent addition based on the set addition interval time and the aggregate addition amount.

9. The addition valve control method according to claim 8, wherein if neither the first condition nor the second condition is satisfied, an immediately previous value of the addition interval time and an immediately previous value of the addition amount per individual addition are used.

10. The addition valve control method according to claim 2, wherein the residual amount, when addition of the additive is suspended during the intermittent addition, is calculated based on the exhaust gas temperature and the duration of the suspension of addition during the intermittent addition.

11. The addition valve control method according to claim 4, wherein the distal end temperature, when addition of the additive is suspended during the intermittent addition, is calculated based on the exhaust energy and the duration of the suspension of addition during the intermittent addition.

12. An addition valve controller that intermittently adds an additive to suppress clogging of an addition valve that supplies the additive to an exhaust passage of an internal combustion engine, the addition valve controller comprising:

a calculating unit, wherein the calculating unit calculates a particulate discharge amount within the exhaust passage based on an engine operation state, wherein the calculating unit calculates exhaust energy from an exhaust gas temperature and an exhaust gas flow rate, and wherein the calculating unit calculates an amount of the additive to be added when intermittently adding the additive, based on the particulate discharge amount and the exhaust energy wherein the calculating unit calculates the addition amount based on a corrected particulate discharge amount, which is obtained by correcting the particulate discharge amount in accordance with a degree of change in the intake air amount that is a value equivalent to the exhaust gas flow rate, and the exhaust energy.

13. An addition valve controller that intermittently adds an additive to suppress clogging of an addition valve that supplies the additive to an exhaust passage of an internal combustion engine, the addition valve controller comprising:

a calculating unit;

an addition determining unit, wherein the calculating unit calculates a particulate discharge amount within the exhaust passage based on an engine operation state, wherein the calculating unit calculates exhaust energy from an exhaust gas temperature and an exhaust gas flow rate, and wherein the calculating unit calculates an amount of the additive to be added intermittently adding the additive, based on the particulate discharge amount and the exhaust energy, wherein the addition amount is calculated based on a corrected particulate discharge amount, which is obtained by correcting the particulate discharge amount in accordance with a degree of change in the intake air amount that is a value equivalent to the exhaust gas flow rate, and the exhaust energy, and wherein the addition determining unit adds the additive from the addition valve when the internal combustion engine satisfies a predetermined condition.

14. The addition valve control method according to claim 7, wherein the residual amount, when addition of the additive is suspended during the intermittent addition, is calculated based on the exhaust gas temperature and the duration of the suspension of addition during the intermittent addition.

15. The addition valve control method according to claim 7, wherein the distal end temperature, when addition of the additive is suspended during the intermittent addition, is calculated based on the exhaust energy and the duration of the suspension of addition during the intermittent addition.

16. The addition valve control method according to claim 7, wherein:

the residual amount, when addition of the additive is suspended during the intermittent addition, is calculated based on the exhaust gas temperature and the duration of the suspension of addition during the intermittent addition;

the distal end temperature, when addition of the additive is suspended during the intermittent addition, is calculated based on the exhaust energy and the duration of the suspension of addition during the intermittent addition.

* * * * *